United States Patent [19]

Kuo et al.

[11] Patent Number: 5,714,247

[45] Date of Patent: Feb. 3, 1998

[54] REFLECTIVE SURFACE FOR LCD AND METHOD FOR FORMING IT

[75] Inventors: Chen-Lung Kuo, Taipei; Dong-Yuan Goang, Ping-Chen; Chun-hsia Chen, Hsinchu, all of Taiwan

[73] Assignee: Industrial Technology Research Institute, Hsinchu, Taiwan

[21] Appl. No.: 665,123

[22] Filed: Jun. 14, 1996

[51] Int. Cl.⁶ .................. B32B 5/16; C08J 7/04; G02F 1/13
[52] U.S. Cl. .............. 428/323; 428/325; 428/328; 428/457; 349/113; 430/16; 430/18; 427/510; 427/250
[58] Field of Search ................. 428/323, 325, 428/328, 457; 349/113; 430/16, 18; 427/510, 250

[56] References Cited

U.S. PATENT DOCUMENTS 5,204,765 4/1993 Mitsui et al. ................. 359/70
5,220,444 6/1993 Mitsui et al. ................. 359/70
5,595,790 1/1997 Wei ................................ 427/510

OTHER PUBLICATIONS

Mitsui et al. "Bright Reflective Multicolor LCDs Addressed by a–Si TFTs" Published in SID 92 Digest. pp. 437–440.

Primary Examiner—Mark Chapman
Attorney, Agent, or Firm—George O. Saile; Stephen B. Ackerman

[57] ABSTRACT

A non-specular reflecting surface for use in a Liquid Crystal Display is obtained by randomly embedding particles in a layer of a resin solution and then baking to hardness. The particles' sizes are approximately the same as the layer's thickness, so a randomly uneven surface is the result. The particles are most commonly, but not necessarily, commercially available plastic microspheres. If a photosensitive resin is selected, it may be shaped into a desired pattern without the need for a separate photoresist and etch step. When a high reflectance metal is deposited onto the resin surface it becomes an effective non-specular reflector.

19 Claims, 4 Drawing Sheets

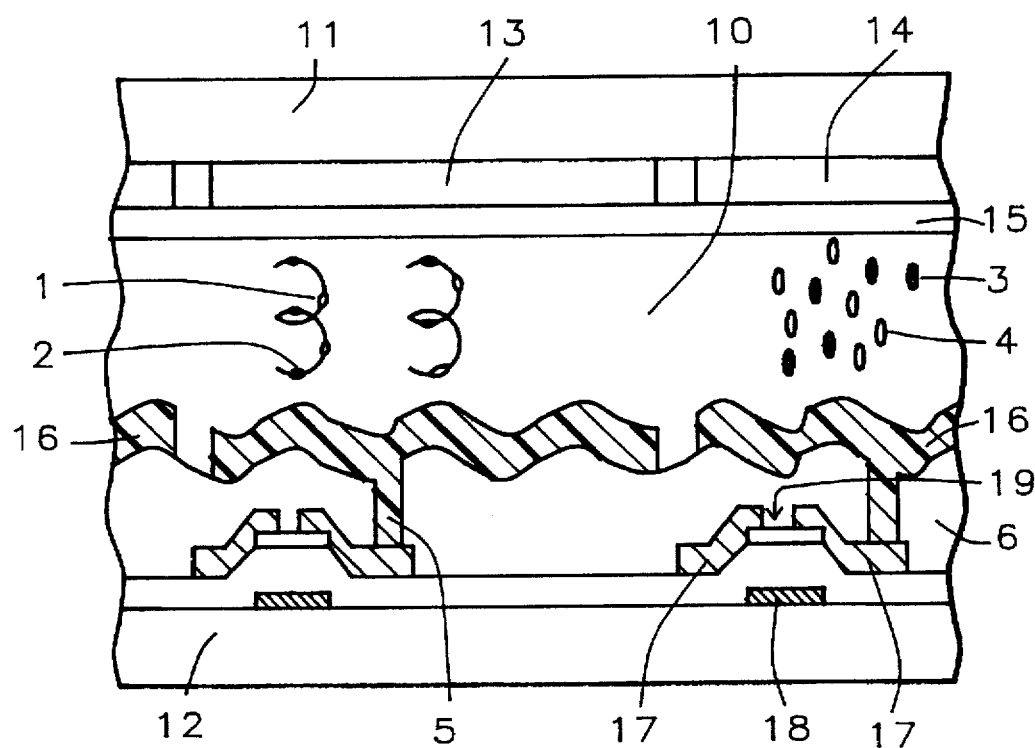
*FIG. 1 - Prior Art*
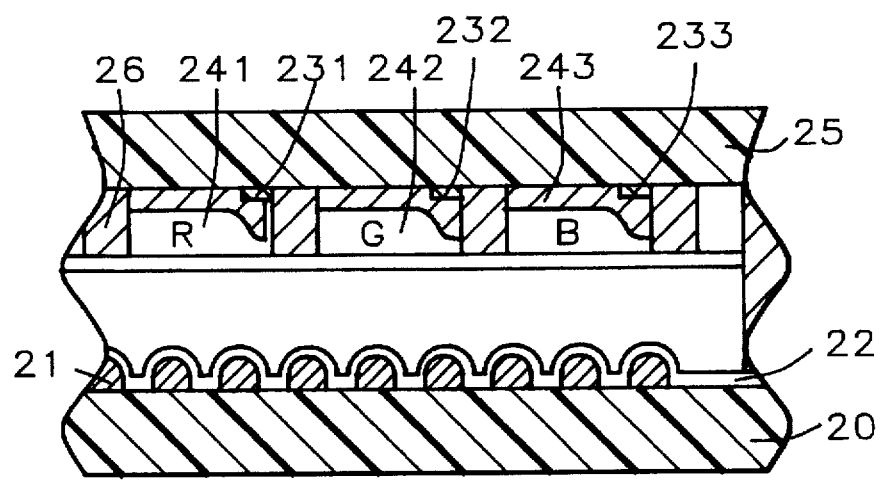
*FIG. 2 - Prior Art*

5,714,247

REFLECTIVE SURFACE FOR LCD AND METHOD FOR FORMING IT

BACKGROUND OF THE INVENTION

(1) FIELD OF THE INVENTION

The invention relates to the general field of ambient lit Liquid Crystal Displays, more particularly to the design of the reflective layer.

(2) DESCRIPTION OF THE PRIOR ART

First generation liquid crystal displays involve a number of layers, the outermost being a pair of crossed polarizers. In the most commonly used configuration, the polarizers are arranged so as to have their optic axes orthogonal to one another. That is, in the absence of anything else between them, light passing through the entrance polarizer would be blocked by the exit polarizer, and vice versa.

Conducting lines running orthogonal to, and insulated from, one another are located on the inside surfaces. These lines are connected at their intersections through Thin Film Transistors (TFTs). The TFTs allow voltage, separately applied to a set of orthogonal lines, to be added together only at the intersecting position which will overlie a given pixel (or sub-pixel) of the display.

Sandwiched between, and confined there by means of suitable enclosing walls, is a layer of liquid crystal. Liquid crystals comprise long molecules, referred to as nematic, or thread-like. The orientation of these molecules, relative to a given surface can be controlled by coating such a surface with a suitable orientation layer which is rubbed in the desired direction just prior to bringing it into contact with the liquid crystals.

Thus, the molecules closest to the upper substrate would be oriented so as to lie in one plane while the molecules closest to lower substrate would be oriented to lie perpendicular to this plane. Molecules in between the two sets of pre-oriented molecules then arrange themselves so as to gradually change their orientations between these two extremes. Hence the term 'twisted nematic' (TN) for such a configuration. A TN is optically active and will rotate the plane of any polarized light that traverses it so that polarized light that was formed and oriented as a result of passing through an entrance polarizer will be rotated though an angle of 90° after traversing the liquid crystal and so will be correctly oriented to pass through the exit polarizer. Such a device is therefore normally on (transmits light).

An important property of TN is that, in the presence of an electric field (typically about 10 kV/cm.), normal to the molecules, said molecules will all orient themselves so as to point in the same direction and the liquid crystal layer will cease to be optically active.

At the present time colored LCDs are built in the same way as monochrome LCDs but their light has been passed through multicolor filters. The latter consists of a matrix of sub-pixel size regions on a common substrate, each region being a tiny color filter. The spatial locations of the different colored regions are known to the liquid crystal display control system which determines the amount of light that is allowed to pass beyond any given dot, thereby creating a color image.

To view the display, light is applied from outside the entrance polarizer and then viewed by looking through the exit polarizer. This implies an independent light source as part of the overall display, adding significantly to its power requirements. In general, it would be preferable to be able to view the display using ambient light alone. In principle this could be achieved by locating a reflecting surface on the inside surface of the exit polarizer and then viewing the display directly.

In practice, this arrangement does not work well with LCDs of the type just described because the polarizers absorb a significant fraction of the incident light, often in excess of 50%. As a result, a new generation of LCDs are currently being developed that do not require the presence of a pair of polarizers.

FIG. 1 is a schematic cross-section of a LCD that operates without the need for polarizers. The figure is taken from a paper by Mitsui et al. "Bright reflective multicolor LCDs addressed by a-Si TFTs" published in SID 92 Digest pp. 437–440. Liquid crystal 10 is confined between upper and lower substrates 11 and 12 respectively, including sub-pixel sized color filters 13 and 14 and transparent conducting electrode 15. An electric field may be selectively applied between 15 and any one of lower electrodes 16.

Selection of a particular electrode is effected by means of TFTs located at the intersections of the orthogonal addressing lines, as already discussed above. Source/drain electrodes 17 contact amorphous silicon layer 19, current through which is controlled from gate electrode 18. Lower electrodes 16 contact the TFTs through via holes such as 5.

In the example illustrated in FIG. 1, the sub-pixel corresponding to filter 13 is off, while the sub-pixel corresponding to filter 14 is on. Two TN spirals are shown below 13. The liquid crystal molecules are schematically shown as open ellipses such as 1. The black ellipses represent black dye molecules that have been added to the liquid crystal. Rather than being randomly oriented within their LC host, these dye molecules follow the orientations of the LC molecules, in this case a spiral. In this configuration, the dye molecules block the passage of light through them.

Continuing to refer to FIG. 1, the sub-pixel corresponding to filter 14 is on. That is, an electric field has been applied across the LC/dye mixture. This causes the LC molecules, such as 4, to line up with the field. Dye molecules, such as 3, follow the orientation of the LC molecules and, now, do not block the passage of light through them. This type of LCD is said to be in phase change guest host (PCGH) mode.

Since the display of FIG. 1 is free of light absorbing polarizers, it can be viewed in ambient light applied from above upper substrate 11. Reflection of the light occurs at the surface of layer 16. It is important to note that layer 16 must not be a planar surface. If it were, the display would behave as an optical interference filter and transmit only a limited range of optical frequencies. Thus it becomes necessary to ensure that reflection at the top surface of layer 16 be non-specular.

A number of approaches to providing non-specular reflecting surfaces for use in LCDs have been described in the prior art. For example, Mitsui et al. (U.S. Pat. No. 5,204,765 Apr 1993) deposit a layer of resin on the substrate and then pattern and etch it to form an array of tiny pedestals sticking out from the surface. The pedestals are then subjected to a heat treatment which causes them to assume a rounded shape somewhat akin to a set of convex lenses. The refelective metallic layer is then deposited over these convexities.

An example of Mitsui et al.'s design is shown in FIG. 2. Convexities 21 have been formed from a resin layer, resting on lower substrate 20, as described above, and have been coated with reflective layer 22. In this design, in contrast to that shown in FIG. 1, the selection matrix for determining which sub-pixels are on is located on the upper substrate.

Selection electrodes 231, 232, and 233 control passage of light through color filters 242, 242, and 243 respectively. Although the use of TFTs is essential when operating in PCGH mode, because of hysteresis problems associated with this mode, they are not shown in the figure. A black matrix, of which 26 is a part, is used to block out light extraneous to the display.

The design shown in FIG. 2 brings out the point that the non-specular reflector may be located as a continuous layer away from the selection matrix or it could be incorporated as part of it (as is the case for the design shown in FIG. 1). The design of FIG. 1 is more efficient with respect to total light throughput but requires additional process steps for fabricating the reflector. The design of FIG. 2 represents a simpler process for fabricating the reflector but is less efficient with respect to light throughput.

A different method for forming the non-specular reflector has been disclosed by Mitsui et al. in U.S. Pat. No. 5,220,444 Jun 1993. A layer of oxide is first deposited and then etched in a manner that results in a roughened surface. The latter is then given a metallic coating.

Both the above methods involve extra steps. Additionally, the first method results in a surface that is non-planar but its non-specularity follows an even pattern (which is not desirable from an optical standpoint), while the non-specularity of the second method is hard to predict.

SUMMARY OF THE INVENTION

It has been an object of the present invention to provide a surface suitable for use as a non-specular reflector in a Liquid Crystal Display.

Another object of the invention has been to provide methods for manufacturing such a surface in an efficient and economic manner.

Yet another object of the invention has to been make such a surface available in either continuous or patterned form.

These objects have been achieved by randomly embedding particles in a layer of a resin solution and then baking it to hardness. The particles' sizes are approximately the same as the layer's thickness, so a randomly uneven surface is the result. The particles are most commonly, but not necessarily, commercially available plastic microspheres. If a photosensitive resin is selected, it may be shaped into a desired pattern without the need for a separate photoresist and etch step. When a high reflectance metal is deposited onto the resin surface it becomes an effective non-specular reflector.

BRIEF DESCRIPTION OF THE DRAWINGS

FIGS. 1 and 2 show LCD designs of the prior art that do not use crossed polarizers.

DESCRIPTION OF THE PREFERRED EMBODIMENTS

Figure 5:
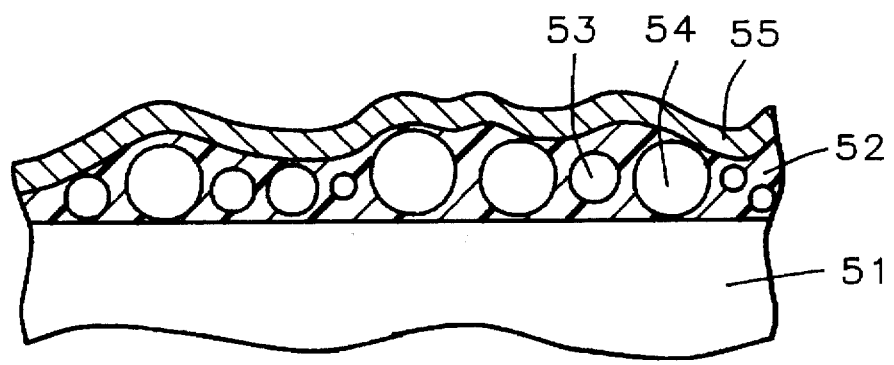
FIG. 5 is a schematic cross-section of a first embodiment of the present invention.

FIG. 5 is a schematic cross-section of a first embodiment of the present invention. Resin layer 52, composed of thermoset plastic such as epoxy, acrylic, or methacrylate resins, or a soluble thermoplastic such as polyethylene, polypropylene, polystyrene, polycarbonate, or polymethyl methacrylate, etc. lies on substrate 51. Embedded in resin 52 are a large number of particles such as 53 and 54, preferably, but not necessarily, spherical in shape. These particles have sizes in the range from about 0.1 to 20 microns, which is similar to the thickness of layer 52 (between about 0.1 and 10 microns). Generally the largest particle will be about twice the size of the smallest one but the invention would still work even if all particles were the same size.

Among the materials from which the particles could be made we include glass, ceramic, metal (such as stainless steel), and plastic (such as acrylic resin, divinylbenzene copolymer, etc.). Commercially available microspheres such as SP-203 polymer spheres (a product of Sekisui Fine Chemical Co. Japan) can, and have been, used. The particles are randomly suspended in layer 52 which is coated with layer 55 of a highly reflective metal such as aluminum, silver, chromium, or, gold.

Figure 3:
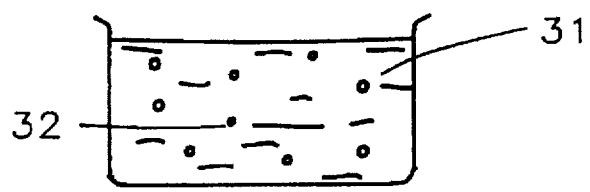
FIGS. 3, 4a and 4b show two different ways to prepare a resin layer in which there are embedded particles.

There are two different ways to provide a resin layer in which particles have been embedded (as described above). Referring now to FIG. 3, particles such as 32 are added to a solution of the resin, for example divinylbenzene polymer spheres in acrylic resin solutions, or glass balls in polycarbonate solutions, etc. The solution is suitably stirred to ensure that the particles are uniformly distributed (density between about $10^6$ and $10^{12}$ particles per cc.) and it is then applied to a substrate, using a technique such as spin coating, print coating, or extrusion coating, at which point it is ready for further processing.

Figure 4A:
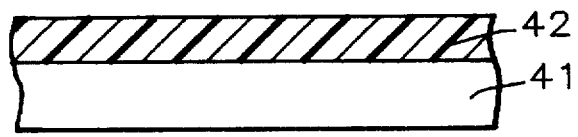
Figure 4B:
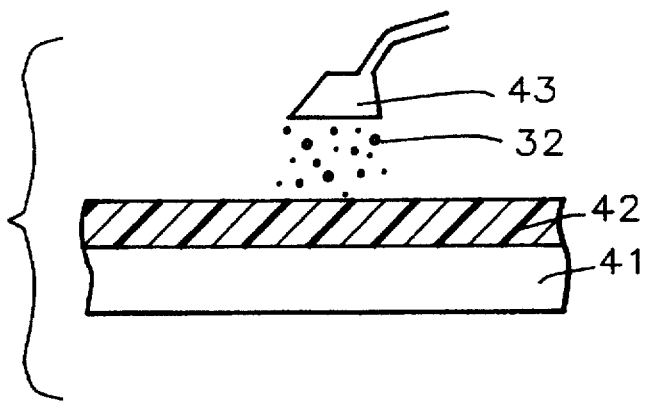

The second way is illustrated in FIGS. 4a and 4b. Pure resin solution 42 is applied to substrate 41 and particles are then distributed over its surface (density between about $10^2$ and $10^8$ particles per sq. cm.) from spraying device 43. After allowing a suitable time for the particles to settle into layer 42 (generally 5 to 120 minutes) layer 42 is ready for further processing, notably baking for between about 5 and 120 minutes at a temperature between about 90° and 250° C. in atmospheric air. After baking, the structure is ready for the application of the reflecting layer, shown as 55 in FIG. 5. This layer may be applied by any of the standard methods, including sputtering, vacuum evaporation, and chemical vapor deposition.

Figure 6:
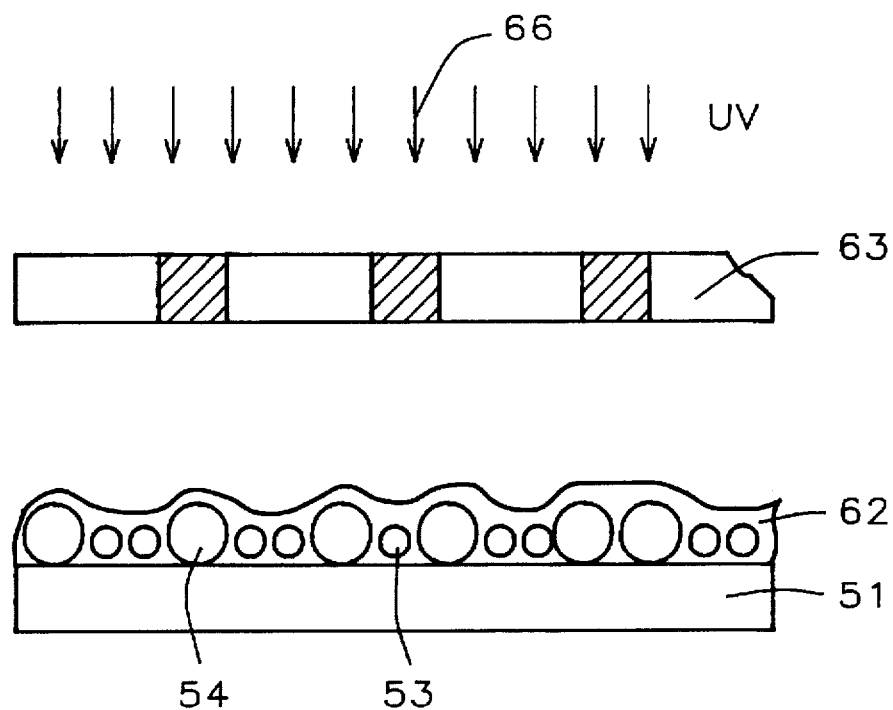
FIGS. 6 and 7 illustrate a second embodiment of the invention in which a photosensitive resin is employed.

Note that the resin layer used to embody the present invention may be one that is photosensitive, without in any way affecting the workability of the invention. For example, any of the photoresists in current use, such as OFPR-800 (a product of Tokyo Ohka Co.) or BLACK 301 (manufactured by Japan Synthetic Rubber Co.) may be employed. If a photosensitive resin is selected it may then be exposed to actinic radiation through a suitable mask, as illustrated in FIG. 6 where photosensitive resin layer 62 on substrate 51, containing embedded particles such as 53 or 54, is exposed to ultraviolet light source 66 through mask 63.

Figure 7:
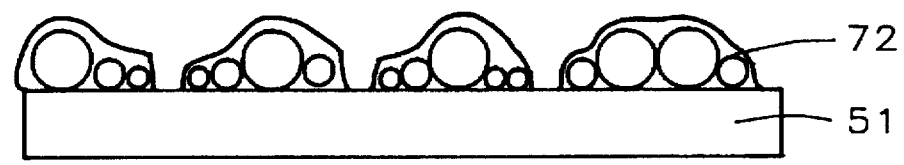

After development, the resin layer 72, including embedded particles, would then appear as shown in FIG. 7. Whether or not a photosensitive resin is selected depends on which type of LCD is to be manufactured. Thus, for the design illustrated in FIG. 1, a photosensitive resin would be needed, whereas for the design illustrated in FIG. 2 it would not.

Figure 8:
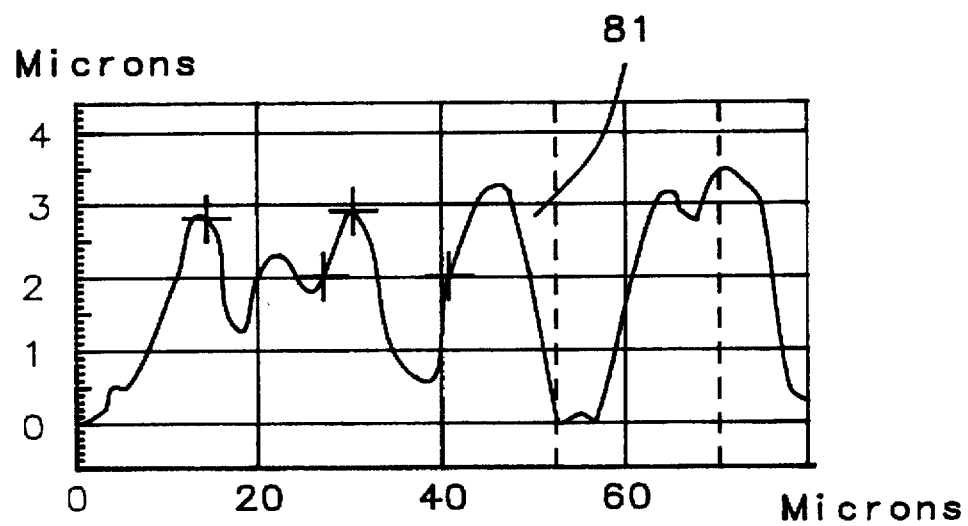
FIGS. 8 and 9 are profiles of surfaces prepared according to the teachings of the present invention.
Figure 9:
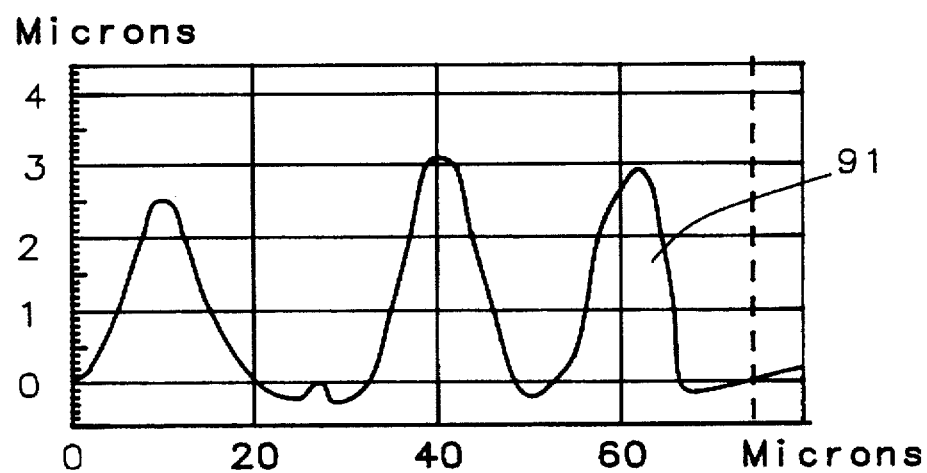

We illustrate the effectiveness of the present invention with respect to the generation of a surface suitable for non-specular reflection by reference to FIGS. 8 and 9. Curve 81 of FIG. 8 shows a profile (height in microns vs. distance in microns) of a surface prepared according to the teachings of the present invention. Commercially available polymer balls, micropearl SP-series (Sekisui Fine Chemical Co. Japan), ranging in size from 3 to 6.5 microns were used together with acrylic resin to provide the profile seen in FIG. 8. The profile reflected by curve 91 of FIG. 9 was obtained by using balls of only a single size (4.8 microns).

While the invention has been particularly shown and described with reference to the preferred embodiments thereof, it will be understood by those skilled in the art that various changes in form and details may be made without departing from the spirit and scope of the invention.

What is claimed is:

1. A non-specular reflector comprising:

a substrate;

a resin layer, having an upper surface, on said substrate;

particles, of a size similar to the thickness of the resin layer, suspended in said resin layer; and a metallic layer on the upper surface of the resin layer.

2. The reflector described in claim 1 wherein said resin layer comprises thermoset plastic such as epoxy, acrylic, or methacrylate resins, or a soluble thermoplastic such as polyethylene, polypropylene, polystyrene, polycarbonate, or polymethyl methacrylate.

3. The reflector described in claim 1 wherein the thickness of said resin layer is between about 0.1 and 10 microns.

4. The reflector described in claim 1 wherein said particles comprise spheres formed of material that is taken from the group consisting of glass, ceramic, metal, including stainless steel, and plastic, including acrylic resin and divinylbenzene copolymer.

5. The reflector described in claim 1 wherein the surface density of the particles is between about $10^2$ and $10^8$ particles per sq. cm.

6. The reflector described in claim 1 wherein said metallic layer is taken from the group consisting of aluminum, silver, chromium, and gold.

7. The reflector described in claim 1 wherein the thickness of said metallic layer is between about $10^3$ and $10^4$ Angstroms.

8. A method for manufacturing a non specular reflector comprising:

(a) providing a substrate;

(b) coating said substrate with a solution of a resin in which particles are suspended;

(c) baking the resin coated substrate; and (d) depositing a layer of a metal on said resin.

9. The method of claim 8 wherein step (b) further comprises:

first dispersing said particles in said resin solution; and
    then coating said substrate.

10. The method of claim 8 wherein step (b) further comprises:

first coating said substrate with the resin solution;
    then spraying the particles onto said resin coating; and
    allowing the particles to settle within said resin coating before proceeding to step (c).

11. The method of claim 8 wherein the size of the particles is between about 0.1 and 20 microns.

12. The method of claim 8 wherein the particles have a spherical shape and are formed of material that is taken from the group consisting of glass, ceramic, metal, including stainless steel, and plastic, including acrylic resin and divinylbenzene copolymer.

13. The method of claim 8 wherein the method for depositing the metallic layer is taken from the group consisting of sputtering, vacuum evaporation, and chemical vapor deposition.

14. The method of claim 8 wherein the method for coating the substrate with the resin solution is spin coating or print coating or extrusion coating.

15. The method of claim 8 wherein the volume density of the particles suspended in the resin solution is between about $10^6$ and $10^{12}$ particles/cc.

16. The method of claim 8 wherein step (c) further comprises baking at a temperature between about 90° and 250° C. for between about 5 and 120 minutes in atmospheric air.

17. A method for manufacturing a non specular reflector, for use in a liquid crystal display, comprising:

(a) providing a substrate;

(b) coating said substrate with a solution of a photosensitive resin in which particles are suspended;

(c) baking the resin coated substrate;

(d) exposing said resin coated substrate to actinic radiation through a pattern bearing mask;

(e) developing said resin to form said pattern; and (f) depositing a layer of a metal on said patterned resin.

18. The method of claim 17 wherein step (b) further comprises:

first dispersing said particles in said resin solution; and
    then coating said substrate.

19. The method of claim 17 wherein step (b) further comprises:

first coating said substrate with the resin solution;
    then spraying the particles onto said resin coating; and
    allowing the particles to settle within said resin coating before proceeding to step (c).

* * * * *